(12) United States Patent
Kim

(10) Patent No.: US 6,975,312 B2
(45) Date of Patent: Dec. 13, 2005

(54) COMPUTER SYSTEM HAVING NETWORK CONNECTOR AND METHOD OF CHECKING CONNECTION STATE OF NETWORK CABLE THEREFOR

(75) Inventor: Jung-dae Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 492 days.

(21) Appl. No.: 10/207,761

(22) Filed: Jul. 31, 2002

(65) Prior Publication Data

US 2003/0107482 A1 Jun. 12, 2003

(30) Foreign Application Priority Data

Dec. 11, 2001 (KR) .......................... 2001-0078233

(51) Int. Cl.⁷ .............................................. G09G 5/00
(52) U.S. Cl. ..................................... 345/211; 324/500
(58) Field of Search ............ 345/204–215; 710/31–35, 710/100–112, 300–304; 714/48, 57, 34; 340/656–662, 340/691.6, 7.55; 324/500–556; G01R 31/00; G09G 5/00

(56) References Cited

U.S. PATENT DOCUMENTS

| | | | |
|---|---|---|---|
| 5,670,972 A | * | 9/1997 | Kim ............................ 345/13 |
| 5,724,645 A | * | 3/1998 | Na ............................ 455/3.02 |
| 5,751,965 A | | 5/1998 | Mayo et al. |
| 5,790,041 A | | 8/1998 | Lee |
| 5,920,266 A | * | 7/1999 | Allgood et al. ............. 710/300 |
| 6,000,003 A | | 12/1999 | Allen et al. |
| 6,145,098 A | | 11/2000 | Nouri et al. |
| 6,448,963 B1 | * | 9/2002 | Han ........................... 345/213 |

FOREIGN PATENT DOCUMENTS

| | | | | |
|---|---|---|---|---|
| JP | 58035622 A | * | 3/1983 | ............. G06F 3/00 |
| JP | 63-73318 | | 4/1988 | |
| JP | 3-260748 | | 11/1991 | |
| JP | 4-296956 | | 10/1992 | |
| JP | 6-75901 | | 3/1994 | |
| JP | 07015559 A | * | 1/1995 | .......... H04M 11/00 |
| JP | 10-115655 | | 5/1998 | |
| JP | 2000-310659 | | 11/2000 | |
| WO | 99/50805 | | 10/1999 | |

* cited by examiner

*Primary Examiner*—Alexander Eisen
(74) *Attorney, Agent, or Firm*—Staas & Halsey LLP

(57) ABSTRACT

A computer system having a network connector to which a network cable is connected, including a displaying part displaying a connection state of the network cable; a signal processing part processing a signal inputted through the network connector; and a control part recognizing the connection state of the network cable based on the processed signal outputted from the signal processing part, and displaying the connection state on the displaying part when the network cable is not connected to the network connector. With this configuration, a computer system is provided in which a connection state of a network cable can be displayed independent of an operating system, and a method therefor.

21 Claims, 4 Drawing Sheets

COMPUTER SYSTEM HAVING NETWORK CONNECTOR AND METHOD OF CHECKING CONNECTION STATE OF NETWORK CABLE THEREFOR

CROSS-REFERENCE TO RELATED APPLICATION

This application claims the benefit of Korean Patent Application No. 2001-78233 filed Dec. 11, 2001 in the Korean Intellectual Property Office, the disclosure of which is incorporated herein by reference.

BACKGROUND OF THE INVENTION

1. Field of the Invention

The present invention relates in general to a computer system, and more particularly, to a computer system capable of checking a connection state of a network cable and a method therefor.

2. Description of the Related Art

In a computer system, it is important for a user to check whether or not a network connector is connected with a network cable so as to use a device such as an Internet appliance for access to a network. However, there has not been a displaying method advising a user whether or not the network connector, such as an RJ-45 (registered jack-45), is connected with the network cable until after an operating system is completely booted. Moreover, a user cannot check a connection state of the network connector until an application program related to the network is executed.

Thus, in the conventional computer system, the connection state of the network cable is not displayed until the application program related to the network is executed after booting the operating system, so that a user must directly check the connection state of the network cable.

SUMMARY OF THE INVENTION

Accordingly, an object of the present invention is to provide a computer system in which a connection state of a network cable can be displayed independent of an operating system.

Additional objects and advantages of the invention will be set forth in part in the description which follows and, in part, will be obvious from the description, or may be learned by practice of the invention.

This and other objects of the present invention may be accomplished by a computer system having a network connector to which a network cable is connected, comprising a displaying part displaying a connection state of the network cable; a signal processing part processing a signal inputted through the network connector; and a control part recognizing the connection state of the network cable on the basis of a signal outputted from the signal processing part, and displaying the connection state on the displaying part when the network cable is not connected to the network connector.

In an aspect of the present invention, the displaying part comprises an on screen display (OSD).

In another aspect of the present invention, the signal processing part comprises an integrating circuit including a first resistor, and a second resistor connected in series between the control part and the network connector, a first capacitor disposed between a node, which is between the first resistor and the second resistor, and a ground, and a second capacitor disposed between a node, which is between the second resistor and the control part, and the ground.

According to another aspect of the present invention, the above and other objects may be also achieved by a method of checking a connection state between a network connector and a network cable in a computer system having the network connector, comprising processing a signal inputted from the network connector; recognizing the connection state of the network cable on the basis of the processed signal; and displaying the connection state when the network cable is not connected to the network connector according to the result of the recognizing.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENT

Figure 1:
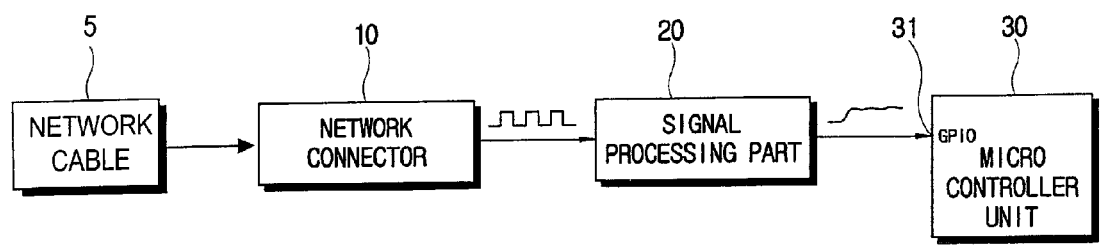
FIG. 1 is a block diagram of a computer system according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

As shown in FIG. 1, a computer system comprises a network connector 10, a signal processing part 20, and a micro controller unit 30.

To the network connector 10 is connected a network cable 5, so that a pulse signal transmitted in the network cable is inputted through the network connector 10 to the signal processing part 20.

Figure 2:
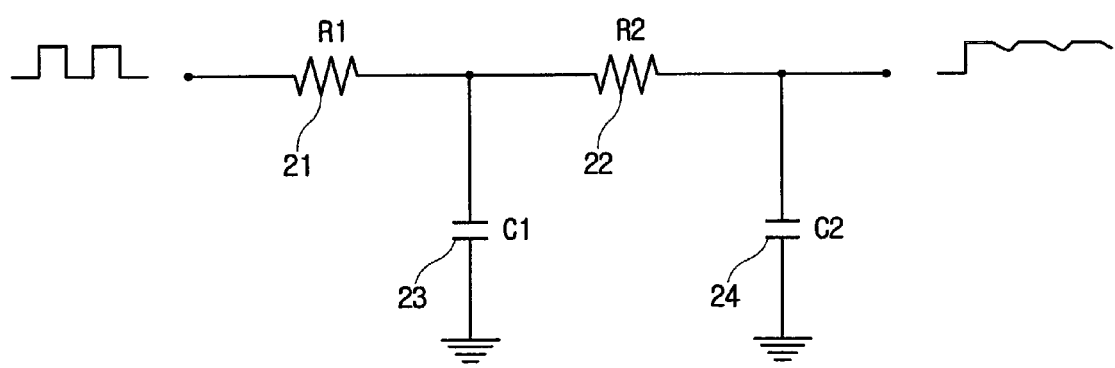
FIG. 2 is a circuit diagram of a signal processing part of FIG. 1.

The signal processing part 20 converts the pulse signal inputted from the network connector 10 into a digital signal, and then outputs the digital signal to the micro controller unit 30. As shown in FIG. 2, the signal processing part 20 comprises an integrating circuit including a first resistor 21 and a second resistor 22 connected with the micro controller unit 30 and the network connector 10 therebetween in series, a first capacitor 23 disposed between a node, which is between the first resistor 21 and the second resistor 22, and a ground, and a second capacitor 24 disposed between a node, which is between the second resistor 22 and the micro controller unit 30, and the ground.

The micro controller unit 30 receives the digital signal outputted from the signal processing part 20 through a GPIO (general purpose input/output) port 31. The micro controller unit 30 determines that the network connector 10 is connected with the network cable 5 when the digital signal outputted from the signal processing part 20 has a (hereinafter high voltage) voltage above the predetermined voltage level. Conversely, when the digital signal has a voltage (hereinafter low voltage) at or below the predetermined voltage level, the micro controller unit 30 determines that the network connector 10 is not connected with the network cable 5 and displays a warning message 40 by an on screen display (OSD) warning a user to check a connection state of the network cable 5.

With this configuration, an operation of the computer system according to the present invention will be described referring to FIG. 3.

When the network connector 10 is connected with the network cable 5, the pulse signal is inputted through the network connector 10 to the signal processing part 20, and then integrated and converted into the digital signal having a voltage above the predetermined level through an integrating circuit of the signal processing part 20.

Here, the signal processing part 20 operates as follows. First, the pulse signal from the network connector 10 is applied to the first resistor 21. Then, when the pulse signal is 'high', the first capacitor 23 and the second capacitor 24 are sequentially charged. Conversely, when the pulse signal is 'low', the first capacitor 23 and the second capacitor 24 are slowly discharged, thereby dropping the voltage of the output terminal of the signal processing part 20. Thus, because the high and the low pulse signals are alternately inputted to the signal processing part 20, the charging and discharging process is repeated, thereby converting the pulse signal into the digital signal having a voltage level above the predetermined voltage level. Herein, an output of the integrating circuit is smoothly varied when a time constant ($\tau=R \times C$) thereof is small compared to the cycle period of the high and the low pulse signals, but the output of the integrating circuit approximately has a rectilinear shape when the time constant thereof is large compared to the cycle period of the high and the low pulse signals.

Figure 3:
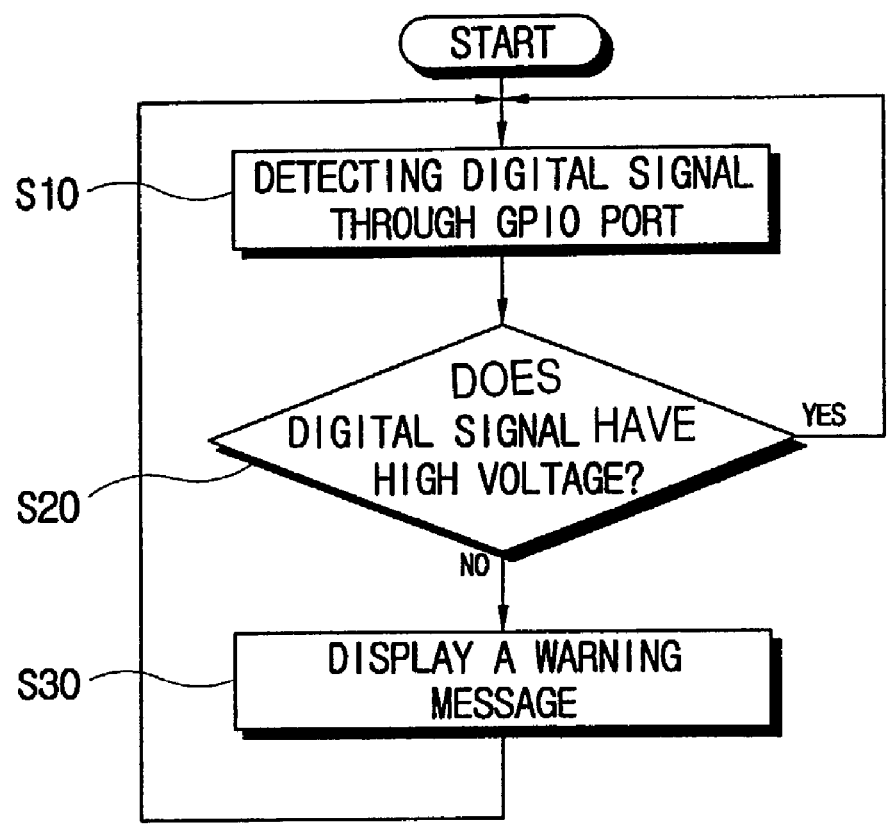
FIG. 3 is a flow chart showing an operation of the computer system according to the present invention.
Figure 4:
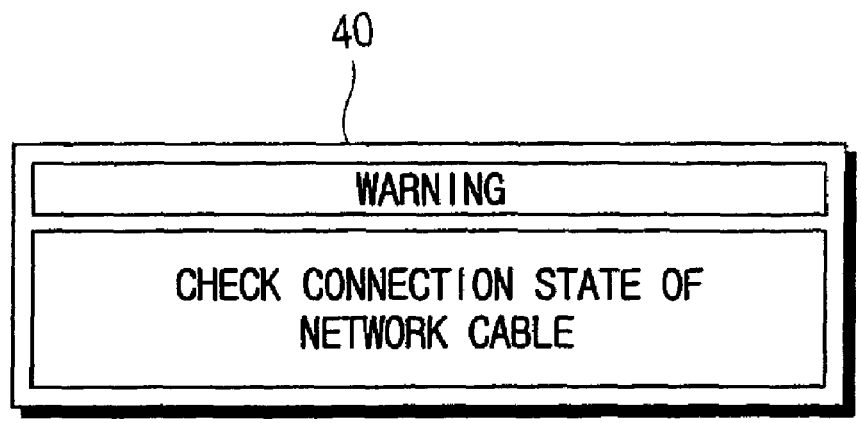
FIG. 4 illustrates a warning message by way of example for warning a user to check a connection state of a network cable.

Thereafter, as shown in FIG. 3, the micro controller unit 30 continuously detects the digital signal outputted from the signal processing part 20 through the GPIO port 31 (S10), and determines whether the detected digital signal has the high voltage or the low voltage in comparison with the predetermined voltage level (S20). If the digital signal has the high voltage, the micro controller unit 30 determines that the network connector 10 is connected with the network cable 5, and does not display the connection state of the network cable 5. However, if the digital signal has the low voltage, the micro controller unit 30 determines that the network connector 10 is not connected with the network cable 5, and displays a warning message 40 (see FIG. 4) using the OSD, warning a user to check the connection state of the network cable 5 (S30). Then, the micro controller unit 30 repeats the above process, detecting the digital signal through the GPIO port 31 by way of a continuous polling.

As described above, when the network cable is not connected to the network connector, a digital signal passed through a signal processing part has a low voltage level because a pulse signal is not inputted to the signal processing part. If the digital signal has the low voltage level, the micro controller unit determines that the network cable is not connected to the network connector, and displays a warning message using an OSD, warning a user to check the connection state of the network cable. Herein, because the micro controller unit continuously detects a GPIO port to recognize whether or not a network cable is connected to a network connector, if the network cable disconnects from the network connector, the connection state of the network cable is instantly displayed by the OSD, thereby warning a user to check the connection state of the network cable.

In the above description, a signal processing part comprises an integrating circuit including resistors and capacitors. However, the signal processing part may comprise any circuit capable of converting a pulse signal into a digital signal.

Further, in the above description, a micro controller unit is used as a control part. However, a signal processing IC (integrated chip) including a GPIO port may be used as the control part.

Further, in the above description, the warning message is displayed by an OSD, however, the warning message may be displayed by an application program.

As described above, the present invention provides a computer system in which a connection state of a network cable can be displayed independent of an operating system, and a method therefor.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A computer system having a network connector to which a network cable is connected, comprising:
    a displaying part displaying a connection state of the network cable;
    a signal processing part processing a signal inputted through the network connector; and
    a control part recognizing the connection state of the network cable based on the processed signal outputted from the signal processing part, and displaying the connection state on the displaying part when the network cable is not connected to the network connector,
    wherein the signal processing part converts the signal, which is a pulse signal, received from the network connector into a digital signal, and the control part recognizes that the network cable is not connected to the network connector when the digital signal has a voltage level at or below a predetermined voltage level.

2. The computer system according to claim 1, wherein the displaying part comprises an on screen display (OSD).

3. The computer system according to claim 1, wherein the signal processing part comprises an integrating circuit capable of converting a pulse signal into a digital signal.

4. The computer system according to claim 1, wherein the control part is a micro controller unit.

5. The computer system according to claim 1, wherein the control part is a signal processing integrated circuit chip having a general purpose input/output port.

6. The computer system according to claim 2, wherein the on screen display (OSD) displays a warning message when the network cable is not connected to the network connector.

7. The computer system according to claim 2, wherein:
    the signal processing part is a low pass filter to convert the signal, which is a pulse signal, received from the network connector into a smoothed pulse signal, and
    the control part recognizes that the network cable is connected to the network connector when the smoothed pulse signal received from the network connector has a voltage level above a predetermined voltage level.

8. The computer system according to claim 1, wherein the signal processing part comprises:
    an integrating circuit including:
    a first resistor,
    a second resistor connected in series with the first resistor and between the control part and the network connector, a first capacitor disposed between a first node, which is between the first resistor and the second resistor, and a ground terminal; and a second capacitor disposed between a second node, which is between the second resistor and the control part, and the ground terminal.

9. A method of checking a connection state between a network connector and a network cable in a computer system having the network connector, comprising:

processing a signal inputted from the network connector;

recognizing the connection state of the network cable based on the processed signal; and displaying the connection state when the network cable is not connected to the network connector according to the result of the recognizing, wherein the processing converts the signal, which is a pulse signal, received from the network connector into a digital signal, and the recognizing recognizes that the network cable is not connected to the network connector when the digital signal has a voltage level at or below a predetermined voltage level.

10. The method according to claim 9, wherein the displaying comprises using an on screen display (OSD) to display the connection state on a screen.

11. The method according to claim 9, wherein the processing comprises converting the signal, which is a pulse signal, into a digital signal.

12. The method according to claim 9, wherein the displaying comprises displaying a warning message when the network cable is not connected to the network connector.

13. The method according to claim 12, wherein the displaying is of a warning message by an application program.

14. The method according to claim 9, wherein the processing comprises:

smoothing the signal inputted from the network connector.

15. The method according to claim 14, wherein a presence of the smoothed signal represents a connection between the network cable and the network cable.

16. The method according to claim 14, wherein an absence of the smoothed signal represents a disconnection between the network cable and the network cable.

17. A computer system having a network connector to which a network cable is connected, comprising:

a display part displaying a connection state of the network cable when the network cable is not connected to the network connector;

a control part detecting a voltage at or below a predetermined voltage level to indicate the network cable is disconnected from the network connector when a pulse signal is absent from the network connector, wherein the voltage is of a digital signal converted from the pulse signal.

18. The computer system according to claim 17, wherein the displaying part comprises an on screen display (OSD).

19. The computer system according to claim 18, wherein the signal processing unit integrates the input signal of the signal processing unit and outputs a smoothed input signal.

20. A computer system operating an operating system and having a network connector to which a network cable is connected, comprising:

a displaying part displaying a connection state of the network cable independent of the operating system; and a control part recognizing the connection state of the network cable, and displaying the connection state on the displaying part when the network cable is not connected to the network connector, the control part recognizing the connection state based on a voltage of a digital signal converted from a pulse signal.

21. A method of checking a connection state between a network connector and a network cable in a computer system operating an operating system and having the network connector, comprising:

recognizing a connection state of the network cable; and displaying the connection state of the network cable independent of the operating system when the network cable is not connected to the network connector, wherein the recognizing is based on a voltage of a digital signal converted from a pulse signal received by the network connector.

* * * * *